United States Patent

Rufenacht

[15] 3,681,494
[45] Aug. 1, 1972

[54] COMPOSITION AND METHOD FOR CONTROLLING PESTS EMPLOYING CERTAIN 1,3,4-THIADIAZOLE-5(4H)-ONE DERIVATIVES

[72] Inventor: Kurt Rufenacht, Basel, Switzerland

[73] Assignee: Ciba-Geigy Corporation, Ardsley, N.Y.

[22] Filed: April 13, 1970

[21] Appl. No.: 28,098

Related U.S. Application Data

[63] Continuation-in-part of Ser. No. 596,445, Nov. 23, 1966, Pat. No. 3,523,951.

[30] Foreign Application Priority Data

Dec. 1, 1965 Switzerland ................16577/65

[52] U.S. Cl..................................................424/200
[51] Int. Cl..........A01n 7/00, A01n 7/04, A01n 9/21
[58] Field of Search ....................424/200; 260/306.7

[56] References Cited

UNITED STATES PATENTS 3,202,673  8/1965  Metivier et al.............260/306.7

Primary Examiner—Jerome D. Goldberg
Assistant Examiner—Leonard Schenkman
Attorney—Karl F. Jorda and Frederick H. Rabin

[57] ABSTRACT

Pesticidal compositions are disclosed which contain as active ingredients 1,3,4-thiadiazole-5(4H)-one derivatives of the formula

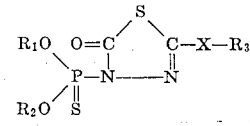

wherein
$R_1$ and $R_2$ each represent lower alkyl,
$R_3$ represents lower alkyl optionally substituted by lower alkoxy or lower alkylthio, and
X represents oxygen or sulphur;
these compositions are useful as soil disinfectant and for controlling insects, spiders, soil fungi and nematodes.

Methods for the disinfection of soil and for controlling said pests are also described.

27 Claims, No Drawings

COMPOSITION AND METHOD FOR CONTROLLING PESTS EMPLOYING CERTAIN 1,3,4-THIADIAZOLE-5(4H)-ONE DERIVATIVES

This application is a continuation-in-part of application Ser. No. 596,445 filed Nov. 23, 1966, now U.S. Pat. No. 3,523,951, issued Aug. 11, 1970.

DETAILED DISCLOSURE.

The present invention relates to new pesticidal compositions for the disinfection of soil and for combatting insects, spiders, soil fungi and nematodes, containing new 1,3,4-thiadiazole-5(4H)-one derivatives as active substances; it also concerns processes for the disinfection of soil and for controlling said pests.

It has now been found that 1,3,4-thiadiazole-5(4H)-one derivatives of the general Formula I

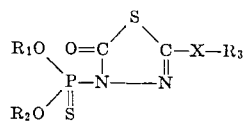

wherein $R_1$ and $R_2$ each represent lower alkyl, $R_3$ represents alkyl having from one to six carbon atoms optionally substituted by lower alkoxy or lower alkylthio and X represents oxygen or sulphur, have excellent fungicidal (soil), insecticidal, acaricidal and in particular nematicidal properties so that the novel compositions according to the invention containing these substances are valuable, in particular, for soil disinfection and for controlling said pests.

By the term "lower" are meant, in connection with the radicals $R_1$ and $R_2$ alkyl groups having from one to four carbon atoms such as the methyl, ethyl, propyl, isopropyl, butyl, iso-butyl, secondary and tertiary butyl, preferably methyl and ethyl. By lower alkoxy or alkylthio groups which can be substituents on the alkyl group $R_3$ are meant radicals having from one to four carbon atoms such as methoxy, ethoxy, propoxy, isopropoxy, butoxy, methylthio, ethylthio, propylthio, isopropylthio and butylthio.

Preferred compositions are those which contain as active substances compounds of formula I wherein $R_1$ and $R_2$ are methyl or ethyl and $R_3$ is alkyl with one to six carbon atoms, or lower alkoxy-lower alkyl with a total number of carbon atoms of from two to six.

By "soil disinfection" is meant the destruction of insects and fungi living in the soil and in particular of nematodes.

The new 1,3,4-thiadiazole-5-(4H)-one derivatives of general formula I may be obtained by reacting a thiocarbazic acid ester of general formula II:

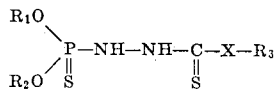

wherein $R_1$, $R_2$, $R_3$ and X have the meanings given in Formula I, with phosgene, the reaction being performed in the presence of a solvent or diluent which is inert to the reaction components and within a temperature range of 0° to 100° C. Phosgene is added to the reaction either as gas or dissolved in an inert solvent, at temperatures between 0° and 30° C. On completion of the addition of phosgene, the reaction mixture is heated to 30° to 100° C, preferably to 30° to 80°. The hydrogen chloride formed during the reaction can, if necessary, be bound by means of a tertiary amine such as triethylamine, pyridine etc.

In the purified state, the new thiadiazole-5-(4H)-one derivatives of general formula I are colorless oils which dissolve well in organic solvents but are insoluble in water. the new compounds have only very slight toxicity for plants and warm blooded animals, for which reason their use is of the greatest importance in the protection of plants and stores and also in combatting pests which threaten health.

The range of action of the active substances mentioned and, in particular, the insecticidal and acaricidal action, is improved by admixture with synergists and auxiliaries having a similar action such as succinic acid dibutyl ester, piperonyl butoxide, olive oil, peanut oil, etc. In the same way, the insecticidal action can be substantially widened and adapted to given circumstances by the addition of other insecticides such as the esters and amides of phosphoric acid, phosphonic acid, thio- and dithio- phosphoric acid, carbamic acid esters, halogenated hydrocarbons, analogues of DDT active substance, pyrethrins and synergists thereof.

The following non-limitative examples serve to illustrate the production of active substances of general Formula I. The other active substances falling under Formula I are produced in an analogous manner. Where not otherwise stated, parts are given therein as parts by weight and the temperatures are in degrees Centigrade.

EXAMPLE 1:

2-Ethoxy-4-(diethoxy-phosphinothioyl)-1,3,4-thiadiazole-5-(4H)-one.

715 Parts by volume of a solution of phosgene in benzene containing 240 parts of phosgene, is added dropwise to a solution of 432 parts of 3-diethoxy-phosphinothioyl thiocarbazic acid-0-ethyl ester (M.P. 58°–59) in 800 parts by volume of anhydrous benzene while slightly cooling, the addition being made so quickly that the reaction temperature remains between 10° and 20°. The whole is stirred for 16 hours at room temperature and is then gradually heated within 1 hour to reflux temperature. After refluxing for 1 hour, the solvent is distilled off and 500 parts of water are added to the residue. The oil which separates out is taken up in ether, the ethereal solution is extracted first with dilute sodium bicarbonate solution and then with water dried over sodium sulphate. After distilling off the ether, the residue is fractionated under high vacuum. 410 Parts of 2-ethoxy-4-(diethoxy-phosphinothioyl)-1,3,4-thiadiazole-5(4H)-one distill at 120°—122°/0.05 Torr as a colorless oil (yield 86 percent).

EXAMPLE 2:

2-Methylthio-4-(diethoxy-phosphinothioyl)-1,3,4-thiadiazole-5(4H)-one.

80 Parts by volume of a solution of phosgene in benzene containing 20 parts of phosgene are added quickly, without external cooling to a slurry of 28 parts of 3-diethoxyphosphinothioyl-dithiocarbazic acid methyl ester (M.P.104°—105°) in 100 parts by volume of anhydrous benzene. The temperature of the mixture rises from 16° to 28° and, while gas is developed, first a yellow solution is formed which, however, becomes colorless after one hour. Excess phosgene and benzene are then distilled off under water jet vacuum. Further working up according to example 1 yields 21 parts of 2-methylthio-4-(diethoxy-phosphinothioyl)-1,3,4-thiadiazole-5(4H)-one as a colorless oil. It boils at 123°—124°/0.02 Torr (yield 70 percent).

EXAMPLE 3:

2-Isopropoxy-4-(diethoxy-phosphinothioyl)-1,3,4-thiadiazole-5(4H)-one.

170 Parts of phosgene are introduced at 5° to 15° to a cooled solution of 355 parts of 3-diethoxy-phosphinothioylthiocarbazic acid-0-isopropyl ester (M.P. 81°—82°) in 1,000 parts by volume of anhydrous benzene. The whole is stirred for 2 hours at room temperature, then heated within 1 hour to reflux temperature whereupon it is refluxed for 1 hour. Further working up according to example 1 yields 315 parts (81 percent yield) of 2-isopropoxy-4-(diethoxy-phosphinothioyl)-1,3,4-thiadiazole-5(4H)-one as a colorless oil. It boils at 124°/0.04 Torr.

EXAMPLE 4:

2-(2'-Methoxy-ethoxy)-4-(dimethoxy-phosphinothioyl)-1,3,4-thiadiazole-5(4H)-one.

33 Parts of phosgene are introduced into a slurry of 69 parts of 3-dimethoxy-phosphinothioyl-thiocarbazic acid-0-(2'-methoxy-ethyl)-ester (M.P. 67°—68°) in 200 parts by volume of anhydrous benzene. The temperature rises to 30° and a clear, yellow solution is formed. The color disappears on heating to reflux temperature. Further working up according to example 1 yields 70 parts of 2-(2'-methoxy-ethoxy)-4-(dimethoxy-phosphinothioyl)-1,3,4-thiadiazole-5(4H)-one as a pale yellow oil which cannot be distilled without decomposition. Crude yield 93 percent.

The compounds summarized in the following Table are produced analogously to examples 1 to 4:

TABLE

| No. | $R_1$ | $R_2$ | $R_3$ | X | Boiling point or melting point |
|---|---|---|---|---|---|
| 1 | $CH_3$ | $CH_3$ | $CH_3$ | O | 104–106°/0.005 Torr |
| 2 | $CH_3$ | $CH_3$ | $C_2H_5$ | O | 115–117°/0.007 Torr |
| 3 | $CH_3$ | $CH_3$ | n $C_3H_7$ | O | 131–132°/0.008 Torr |
| 4 | $CH_3$ | $CH_3$ | iso-$C_3H_7$ | O | 113–114°/0.005 Torr |
| 5 | $CH_3$ | $CH_3$ | n $C_4H_9$ | O | 125°10.001 Torr |
| 6 | $CH_3$ | $CH_3$ | $CH_3$ | S | 140–142°/0.02 Torr |
| 7 | $CH_3$ | $CH_3$ | $C_2H_5$ | S | 125°/0.001 Torr |
| 8 | $CH_3$ | $CH_3$ | n $C_3H_7$ | S | 125°/0.001 Torr |
| 9 | $CH_3$ | $CH_3$ | $CH_3OC_2H_4$ | S | 140°/0.005 Torr |
| 10 | $CH_3$ | $CH_3$ | $C_2H_5OC_2H_4$ | S | 140°/0.01 Torr |
| 11 | $CH_3$ | $CH_3$ | iso-$C_3H_7OC_2H_4$ | O | 130°/0.002 Torr |
| 12 | $CH_3$ | $CH_3$ | $CH_3SC_2H_4$ | S | |
| 13 | $C_2H_5$ | $C_2H_5$ | $CH_3$ | O | 115–116°/0.03 Torr |
| 14 | $C_2H_5$ | $C_2H_5$ | n $C_3H_7$ | O | 128–130°/0.05 Torr |
| 15 | $C_2H_5$ | $C_2H_5$ | n $C_4H_9$ | O | 131–132°/0.03 Torr |
| 16 | $C_2H_5$ | $C_2H_5$ | iso-$C_4H_9$ | O | 130–131°/0.015 Torr |
| 17 | $C_2H_5$ | $C_2H_5$ | sec.$C_4H_9$ | O | |
| 18 | $C_2H_5$ | $C_2H_5$ | n $C_5H_{11}$ | O | 137–139°/0.003 Torr |
| 19 | $C_2H_5$ | $C_2H_5$ | n $C_6H_{13}$ | O | 156°/0.001 Torr |
| 20 | $C_2H_5$ | $C_2H_5$ | $C_2H_5$ | S | 133–134°/0.01 Torr |
| 21 | $C_2H_5$ | $C_2H_5$ | n $C_3H_7$ | S | 125°/0.0005 Torr |
| 22 | $C_2H_5$ | $C_2H_5$ | iso-$C_3H_7$ | S | 126–127°/0.008 Torr |
| 23 | $C_2H_5$ | $C_2H_5$ | $CH_3$—$C_2H_4$ | O | 142°/0.015 Torr |
| 24 | $C_2H_5$ | $C_2H_5$ | $C_2H_5OC_2H_4$ | O | 140°/0.005 Torr |
| 25 | $C_2H_5O$ | $C_2H_5$ | iso-$C_3H_7OC_2H_4$ | O | 140–142°/0.2 Torr |
| 26 | $C_2H_5O$ | $C_2H_5$ | $CH_3OC_2H_4$ | S | 140°/0.005 Torr |
| 27 | $C_2H_5O$ | $C_2H_5$ | $C_2H_5OC_2H_4$ | S | 140°/0.01 Torr |
| 28 | $C_2H_5O$ | $C_2H_5$ | iso-$C_3H_7OC_2H_4$ | S | 140°/0.01 Torr |
| 29 | $C_2H_5O$ | $C_2H_5$ | $C_2H_5SC_2H_4$ | S | |
| 30 | $C_2H_5O$ | $C_2H_5$ | iso-$C_3H_7SC_2H_4$ | S | |
| 31 | iso-$C_3H_7O$ | iso-$C_3H_7$ | $CH_3$ | O | 112–116°/0.015 Torr |
| 32 | iso-$C_3H_7O$ | iso-$C_3H_7$ | iso-$C_3H_7$ | O | 122–124°/0.004 Torr |
| 33 | iso-$C_3H_7O$ | iso-$C_3H_7$ | $CH_3$ | S | 50–51° |
| 34 | iso-$C_3H_7O$ | iso-$C_3H_7$ | $CH_3SC_2H_4$ | S | |

For use in soil disinfection and for the combatting of insects and spiders the new active substances are incorporated in the usual way into distributing agents and/or carriers and so used that the concentration of active substance is in the range of 0.005 to 10 percent calculated on the total weight of the composition. As concentrates the compositions according to the invention contain the active substance in a concentration of 10 to 80 percent by weight.

The pesticidal compositions according to the invention are produced by intimately mixing and milling the active substances of general formula I with suitable carriers, optionally with the addition of dispersing agents or solvents which are inert to the active substances. The new active substances can be used in form of dusts, sprinkling agents, granulates such as coated granules, impregnated granules, homogeneous granules, wettable powders, pastes, emulsions, solutions or aerosols.

To produce the solid forms for use (dusts, sprinkling agents, granulates), the active substances are mixed with solid carriers. Examples of carriers are kaolin, talcum, bole, loess, chalk, limestone, ground limestone, ataclay, dolomite, diatomaceous earth, precipitated silicic acid, alkaline earth silicates, sodium and potassium aluminum silicates (feldspar and mica), calcium and magnesium sulphate, magnesium oxide, milled synthetic plastics, fertilizers such as ammonium sulphate, ammonium nitrate, urea, ground vegetable products such as bran, bark dust, sawdust, ground nutshells, cellulose powder, residues of plant extractions, active charcoal, etc. These carriers can be used alone or admixed with each other.

The particle size of the carriers is, for dusts advantageously up to about 0.1 mm, for sprinkling agents from about 0.075 — 0.2 mm and for granulates from 0.2 mm or more.

To these mixtures can also be added additives which stabilize the active substance and/or non-ionic, anionically and cationally active substances which, for example, improve the adhesion of the active substances on plants and parts thereof (glues and adhesives) and/or attain better wettability (wetting agents) and dispersibility (dispersing agents) of the active substances. The following are examples of adhesives: olein-chalk mixture, cellulose derivatives (methyl cellulose, carboxymethyl cellulose, hydroxyethyl cellulose); the following substances can serve e.g. as wetting and dispersing agents: polyethylene glycol ethers of mono- and di-alkylphenols having 5 — 15 ethylene oxide radicals per molecule and 8 — 9 carbon atoms in the alkyl radical, lignin sulphonic acids, the alkali and alkaline earth salts thereof, polyethylene glycol ethers (carbowaxes), fatty alcohol polyethylene glycol ethers having 5 — 20 ethylene oxide radicals per molecule and 8 — 18 carbon atoms in the fatty alcohol part, condensation products of ethylene oxide/propylene oxide, polyvinyl pyrrolidones, polyvinyl alcohols, condensation products of urea/formaldehyde, as well as Latex products.

The concentrates of active substances which can be dispersed in water, i.e. wettable powders, pastes and emulsion concentrates, are agents which can be diluted with water to any concentration desired. They consist of active substance, carrier, optionally additives which stabilize the active substance, surface active substances, and anti-foam agents and, optionally, solvents.

Wettable powders and pastes are obtained by mixing and milling the active substances with dispersing agents and pulverulent carriers in suitable apparatus until homogeneity is attained. Carriers are, for example, those mentioned in the paragraph dealing with solid forms for application. In some cases it is advantageous to use mixtures of different carriers. The following can be used e.g. as dispersing agents: condensation products of sulphonated naphthalene and sulphonated naphthalene derivatives with formaldehyde, condensation products of naphthalene or naphthalene sulphonic acids with phenol and formaldehyde, also alkali, ammonium and alkaline earth salts of lignin sulphonic acid, also alkyl aryl sulphonates, alkali and alkaline earth salts of dibutyl naphthalene sulphonic acid, fatty alcohol sulphates such as salts of sulphated hexadecanols, heptadecanols, octadecanols, octadecenols and salts of sulphated fatty alcohol polyglycol ethers, the sodium salt of oleoyl ethionate, the sodium salt of oleoyl methyl tauride, ditertiary acetylene glycols, dialkyl dilauryl ammonium chloride and fatty acid alkali and alkaline earth salts.

Silicones, as "Antifoam A" are used, for example, as anti-foam agents. The active substances are so mixed, milled, sieved and strained with the additives mentioned above that the solid particle size in wettable powders of 0.02 — 0.04 mm and, in pastes of 0.003 mm is not exceeded. To produce emulsion concentrates and pastes, dispersing agents such as those given in the previous paragraphs, organic solvents and water are used. Examples of solvents are as follows: alcohols, benzenes, xylenes, toluene, dimethyl sulphoxide and mineral oil fractions boiling between 120° and 350° C. The solvents must be odorless, not phytotoxic, inert to the active substances and not easily inflammable.

In addition, the compositions according to the invention can be applied in the form of solutions. For this purpose, the active substance or several active substances of general formula I are dissolved in suitable organic solvents, mixtures of solvents or in water. Aliphatic and aromatic hydrocarbons, chlorinated derivatives thereof, alkyl naphthalenes, alone or mixed with each other can be used as organic solvents. The solutions should contain the active substances in a concentration from 1 — 20 percent.

Other biocidally active compounds or agents can be mixed with the compositions according to the invention described. Thus, to broaden the range of action, the new compositions can contain, in addition to the compounds mentioned of general formula I e.g. insecticides, other fungicides, bactericides, fungistatics, bacteriostatics or nematocides. The compositions according to the invention can also contain fertilizers, trace elements, etc.

The following forms for application of the compositions according to the invention serve to illustrate the invention further. Where not otherwise expressly stated, "parts" mean parts by weight.

Dust

To produce (a) a 10 percent and (b) a 2 percent dust, the following substances are used:
  a. 10 parts of 2-ethoxy-4-(diethoxy-phosphinothioyl)-1,3,4-thiadiazole-5(4H)-one,
    5 parts of highly dispersed silicic acid,
    85 parts of talcum.
  b. 2 parts of 2-methylthio-4-(diethoxy-phosphinothioyl)-1,3,4-thiadiazole-5(4H)-one,
    1 part of highly dispersed silicic acid,
    97 parts of talcum.

The active substances are mixed and milled with the carriers. The dusts obtained are suitable e.g. for combatting cockroaches and ants in houses. To disinfect soil, these dusts can also be worked into the soil.

Sprinkling Agent

To produce a 25 percent sprinkling agent, the following substances are used:
  25 parts of 2-isopropoxy-4-(diethoxy-phosphinothioyl)-1,3,4-thiadiazole-5-(4H)-one,
  0.25 parts of an emulsifying combination (alkylarylpolyethylene glycol, alkylaryl sulphonate, - calcium salt), 50 parts of kieselguhr,
  24.75 parts of calcium sulphate (aqueous).

The active substance is intimately mixed with the emulsifier and the kieselguhr, and then the calcium sulphate is mixed in. A sprinkling agent is obtained which is particularly suitable for soil disinfection.

Wettable Powder

To produce (a) a 50 percent and (b) a 10 percent wettable powder, the following components are used:
  a. 50 parts of 2-(2'-methoxy-ethoxy)-4-(dimethoxy-phosphinothioyl)-1,3,4-thiadiazole-5(4H)-one,
    5 parts of naphthalene sulphonic acid/benzene sulphonic acid/formaldehyde condensate,
    5 parts of Champagne chalk,
    20 parts of kieselguhr,
    15 parts of kaolin,
    5 parts of oleoyl methyl tauride sodium salt.
  b. 10 parts of 2-methoxy-4-(dimethoxy-phosphinothioyl)-1,3,4-thiadiazole-5(4H)-one,
    3 parts of a mixture of the sodium salts of saturated fatty alcohol sulphates,
    5 parts of naphthalene sulphonic acid/formaldehyde condensate,
    82 parts of kaolin.

The active substances are intimately mixed with the additives in suitable mixers and milled on corresponding mills and rollers. Wettable powders are obtained which can be diluted with water to any concentration desired. Such suspensions can be used for both soil disinfection and to combat ticks in pets and domestic animals.

Emulsion Concentrate

To produce a 25% emulsion concentrate,
  25 parts of 2-propoxy-4-(dimethoxy-phosphinothioyl)-1,3,4-thiadiazole-5(4H)-one,
    2.5 parts of epichlorohydrin, 5 parts of an emulsifying combination (alkylaryl polyethylene glycol/alkylaryl sulphonate, calcium salt), 67.5 parts of xylene, are mixed together. This concentrate can be diluted with water to form emulsions having concentrations suitable for the protection of plants and stores. In particular, such emulsions are suitable for combatting ticks in pets and domestic animals.

I claim:

1. A composition for killing pests selected from the group consisting of fungi, insects, nematodes and acarina comprising a pesticidally effective amount of a compound of the formula $$\begin{array}{c} R_1O \\ \diagdown \\ P-N-N \\ \diagup \\ R_2O \end{array} \begin{array}{c} S \\ \diagup \diagdown \\ O=C \quad C-X-R_3 \\ \| \\ N-N \end{array}$$

wherein
R$_1$ and R$_2$ each represent lower alkyl,
R$_3$ represents alkyl having from 1 to 6 carbon atoms optionally substituted by lower alkoxy or lower alkylthio and
X is oxygen or sulfur,
and a carrier or distributing agent therefor.

2. The composition of claim 1 wherein R$_1$ and R$_2$ each represent methyl or ethyl, and R$_3$ is alkyl having from one to six carbon atoms or lower alkoxy-alkyl having a total number of carbon atoms of from 2 to 6.

3. The composition of claim 1 wherein the pesticidally effective compound is 2-ethoxy-4-(diethoxy-phosphinothioyl)-1,3,4-thiadiazole-5-(4H)-one.

4. The composition of claim 1 wherein the insecticidally effective compound is 2-methoxy-4-(diethoxy-phosphinothioyl)-1,3,4-thiadiazole-5-(4H)-one.

5. The composition of claim 1 wherein the acaricidally effective compound is 2-iso-propoxy-4-(diethoxy-phosphinothioyl)-1,3,4-thiadiazole-5(4H)-one.

6. The composition of claim 1 wherein the acaricidally effective compound is 2-(2'-methoxy-ethoxy)-4-(diethoxy-phosphinothioyl)-1,3,4-thiadiazole-5(4H)-one.

7. The composition of claim 1 wherein the nematocidally effective compound is 2-methylthio-4-(diethoxy-phosphinothioyl)-1,3,4-thiadiazole-5(4H)-one.

8. The composition of claim 1 wherein the nematocidally effective compound is 2-n-propoxy-4-(diethoxy-phosphinothioyl)-1,3,4-thiadiazole-5(4H)-one.

9. The composition of claim 1 wherein the nematocidally effective compound is 2-(2'-isopropoxy-ethoxy)-4-(diethoxy-phosphinothioyl)-1,3,4-thiadiazole-5(4H)-one.

10. A method for killing pests selected from the group consisting of fungi, insects, nemotodes and acarina which comprises applying to said pests a pesticidally effective amount of the compound of claim 1.

11. A method for killing pests selected from the group consisting of fungi, insects, nemotodes and acarina which comprises applying to said pests a pesticidally effective amount of the compound of claim 2.

12. A method for killing pests selected from the group consisting of fungi, insects, nematodes and acarina in soil, which method comprises applying to the soil a pesticidally effective amount of the compound of claim 1.

13. A method for killing pests selected from the group consisting of fungi, insects, nematodes and acarina in soil, which method comprises applying to the soil a pesticidally effective amount of the compound of claim 2.

14. A method for killing insects which comprises applying to the insects an insecticidally effective amount of the compound of in claim 1.

15. A method for killing insects which comprises applying to the insects an insecticidally effective amount of the compound of claim 2.

16. A method for killing insects which comprises applying to the insects an insecticidally effective amount of the compound of claim 3.

17. A method for killing insects which comprises applying to the insects an insecticidally effective amount of the compound of in claim 4.

18. A method for killing acarina which comprises applying to the acarina an acaricidally effective amount of the compound of in claim 1.

19. A method for killing acarinae which comprises applying to the acarina an acaricidally effective amount of the compound of claim 2.

20. A method for killing acarinae which comprises applying to the acarina an acaricidally effective amount of the compound of claim 5.

21. A method for killing acarinae which comprises applying to the acarina an acaricidally effective amount of the compound of claim 6.

22. A method for killing nematodes which comprises applying to the nematodes a nematocidally effective amount of the compound of claim 1.

23. A method for killing nematodes which comprises applying to the nematodes a nematocidally effective amount of the compound of in claim 2.

24. A method for killing nematodes which comprises applying to the nematodes a nematocidally effective amount of the compound of claim 3.

25. A method for killing nematodes which comprises applying to the nematodes a nematocidally effective amount of the compound of claim 7.

26. A method for killing nematodes which comprises applying to the nematodes a nematocidally effective amount of the compound of claim 8.

27. A method for killing nematodes which comprises applying to the nematodes a nematocidally effective amount of the compound of claim 9.

* * * * *